United States Patent
Savicki

[11] Patent Number: 6,095,088
[45] Date of Patent: Aug. 1, 2000

[54] PET LITTER BOX ASSEMBLY

[75] Inventor: Alan F. Savicki, South Windsor, Conn.

[73] Assignee: First Brands, Danbury, Conn.

[21] Appl. No.: 08/700,706

[22] Filed: Aug. 12, 1996

[51] Int. Cl.$^7$ .................................................. A01K 1/035
[52] U.S. Cl. ............................................................ 119/166
[58] Field of Search ................................... 119/166, 165, 119/167, 170

[56] References Cited

U.S. PATENT DOCUMENTS

| | | | |
|---|---|---|---|
| D. 381,136 | 7/1997 | Savicki | 119/166 |
| 4,325,325 | 4/1982 | Larter | 119/166 |
| 4,522,150 | 6/1985 | Gershman | 119/165 |
| 5,168,834 | 12/1992 | Buschur | 119/166 |
| 5,377,626 | 1/1995 | Kilsby et al. | 119/796 |
| 5,402,751 | 4/1995 | De La Chevrotiere | 119/166 |
| 5,551,375 | 9/1996 | Flores | 119/166 |
| 5,577,462 | 11/1996 | Korth | 119/166 |
| 5,590,623 | 1/1997 | Toole et al. | 119/165 |

*Primary Examiner*—Edgar Burr
*Assistant Examiner*—Amanda B. Sandusky

[57] ABSTRACT

A pet litter box assembly is provided having an open-ended base into which litter can be placed, a cover which can be latched upon the base in order to seal the base and a waste collecting member mounted within the cover at a position spaced from the underside of the cover. When waste and used litter deposited in the base needs to be separated from non-used litter placed in the base, the cover can be seated upon and latched to the base and the pet litter box assembly can be rotated to cause the contents of the base to flow onto the waste collecting member. The waste collecting member includes numerous filtering orifices that are sized to permit non-used litter granules to readily flow therethrough while waste and used litter is collected in the waste collecting member for disposal. The base and the cover have double-wall constructions and therefore each includes inner and outer wall portions. The inner wall portion of the cover and lateral sides of the waste collecting member include interengaging structure which permits the waste collecting member to be readily removed for ease of cleaning.

24 Claims, 8 Drawing Sheets

PET LITTER BOX ASSEMBLY

BACKGROUND OF THE INVENTION

1. Field of the Invention

The present invention pertains to a pet litter box and, more particularly, to a litter box assembly which provides for the easy collection and disposal of waste deposited therein.

2. Discussion of the Prior Art

For various animals, particularly household cats, it is common to provide a box within which litter is maintained so that the animal may relieve itself in a generally sanitary manner. Such boxes usually take the form of low level, open containers within which the cat or other animal can readily enter when necessary. In the past, newspaper or another liner material would be placed in the bottom of the container and the litter would be placed atop this material. After a period of use, the entire contents of the box would be discarded and a new liner, as well as additional litter, would be placed in the box.

With the introduction of litter which forms clumps when placed in contact with urine and other forms of wet animal waste, it has become possible to filter out the waste such that the non-used litter remaining in the box can be retained. This represents a considerable savings as a fair percentage of the initial litter placed in the box remains useful even following prolonged periods between cleanings. This filtering operation can be performed in various ways. Commonly today, the clumped waste is simply manually scooped out of the box through the use of a hand held utensil such as a large spoon or strainer. Such a cleaning method results in the loss of a certain amount of untainted litter and is also generally frowned upon due to the close personal exposure to the waste.

To overcome this problem, it has been heretofore proposed to incorporate filter or screen arrangements as part of overall litter boxes. Such known arrangements include the use of one or more screens which are initially positioned below the litter but which can be readily lifted to collect the clumped waste while permitting the remaining, still useful litter to pass therethrough for future use Such an arrangement certainly represents a more appealing cleaning solution than the more conventional scooping method, however, either numerous screens must be provided or a problem is created in replacing the screen.

In U.S. Pat. No. 5,402,751, a pet litter box is disclosed which provides for easy cleaning thereof and which only requires a single screen member. In accordance with this patented arrangement, a removable cover member is placed upon a litter containing base when cleaning is necessary. The entire litter box unit is then manually lifted and rotated to cause the contents of the box to flow into a pocket created in the cover member. This pocket is defined, at least in part, by a screen member which functions to collect the clumped waste and to return the useful litter back into the base. The cover member is then removed and separately emptied.

Although the litter box arrangement of U.S. Pat. No. 5,402,751 is considered to have various advantages over other known arrangements, there still exist various drawbacks. For instance, the entire litter box arrangement has a solid wall construction and in order to create an adequate sealing area between the cover member and the base to avoid any litter granules falling out while the unit is rotated, the walls have to be made fairly thick which adds to manufacturing costs. In addition, the cover member is not securely latched to the base to avoid the possibility of spilling the entire contents of the box. Furthermore, the screen is affixed to the cover and this can be a cumbersome arrangement when attempting to thoroughly clean the screen itself.

U.S. Pat. No. 4,522,150 discloses a cat litter housing, large enough to accommodate a cat, which includes a removable drawer-like container having a screen bottom which is mounted in the upper portion of the housing. The support for the removable container blocks the area between one side of the housing and container while the other side remains open so that when the housing is rotated, the litter flows along the side wall of the housing and into the container. When the housing is rotated back into the upright position, the particulate litter drops through the screen bottom of the container while solid waste and agglomerated litter remain in the container where it can be removed and disposed of by withdrawing the container from the housing.

The arrangement shown in U.S. Pat. No. 4,522,150, while allowing for the removal of waste through the drawer-like container, requires a relatively large housing in order to accommodate the pet and, therefore, is cumbersome and difficult to transport.

Therefore, there exists a need in the art for a litter box arrangement which overcomes certain problems associated with the prior art. More specifically, there exists a need for a litter box arrangement which can be easily manipulated to filter out waste without the potential of litter granules leaking or the entire contents spilling, and which provides a construction that facilitates cleaning of the box.

SUMMARY OF THE INVENTION

The invention advantageously provides a pet litter box assembly comprised of a base, a cover and a waste collecting member wherein the cover can be selectively latched upon the base and the waste collector member is removably attached to the cover. The base and the cover have a double-wall construction which provides for an enlarged sealing area between the base and the cover to improve sealing therebetween while minimizing associated material costs and increasing the structural integrity of the assembly when compared to an assembly of a thicker, single wall construction. The base is adapted to house a supply of pet litter, particularly litter which inherently clumps when contacted by urine and other wet pet waste products, during normal use. When waste and used litter need to be separated from non-used litter during cleaning of the box, the cover is seated upon and latched to the base and then the pet litter box assembly is rotated to cause the contents of the base to flow through the waste collecting member. The waste collecting member includes numerous, spaced filtering orifices that are sized to permit non-used litter granules to readily flow therethrough while waste and used litter is collected in the waste collecting member for disposal. Thus, the waste collecting member also serves as a litter filtering member. Further, the waste collecting member is designed to be readily removable from the cover so both the interior of the cover and the waste collecting member can be easily and thoroughly cleaned as necessary.

Additional features and advantages of the pet litter box assembly of the invention will become more readily apparent from the following detailed description of the embodiment discussed hereinafter when taken in conjunction with the following drawings wherein like reference numerals refer to corresponding parts in the several views.

DETAILED DESCRIPTION OF THE PREFERRED EMBODIMENT

Figure 1:
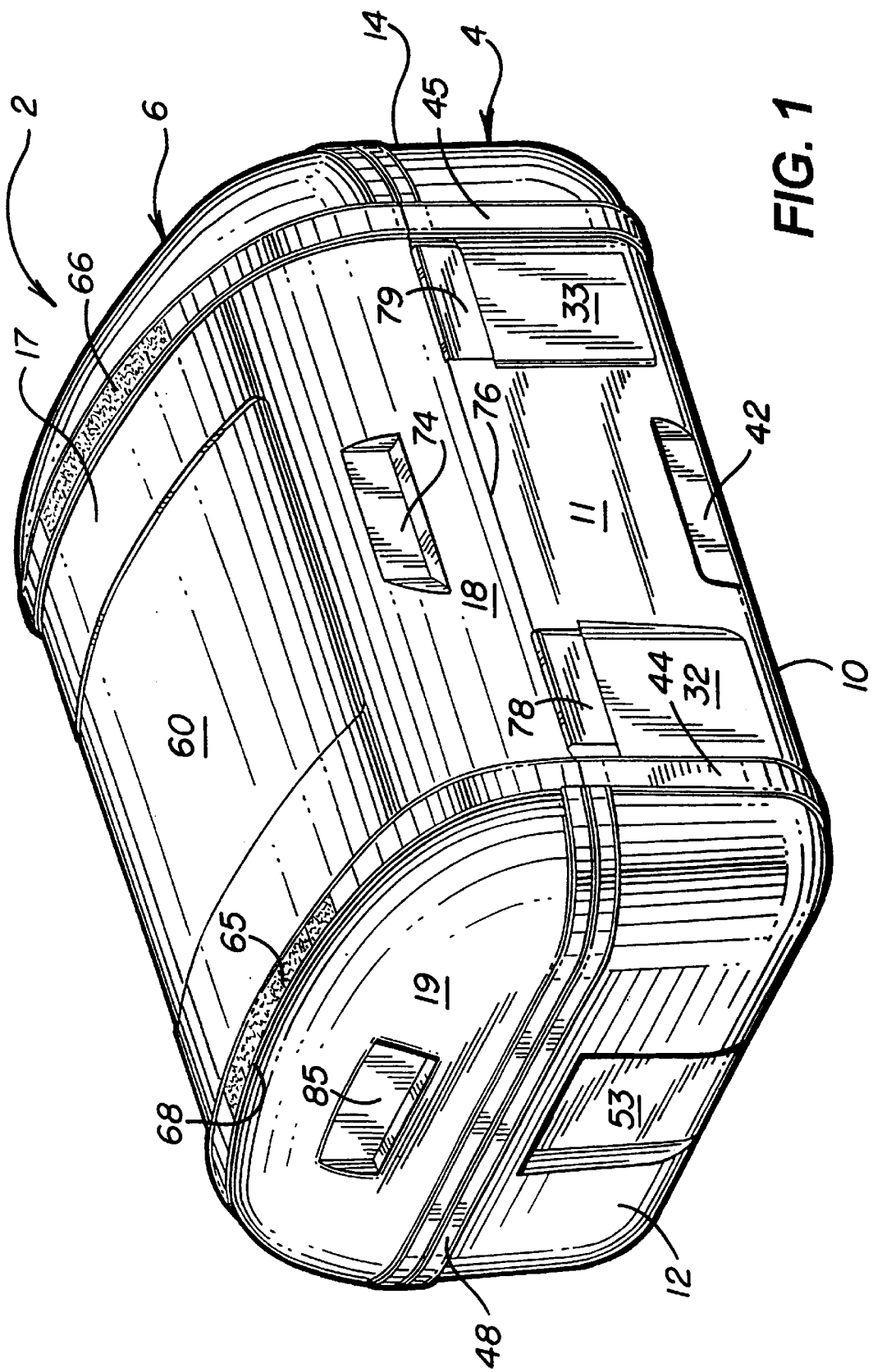
FIG. 1 is a perspective view of a litter box assembly according to a preferred embodiment of the invention.
Figure 8:
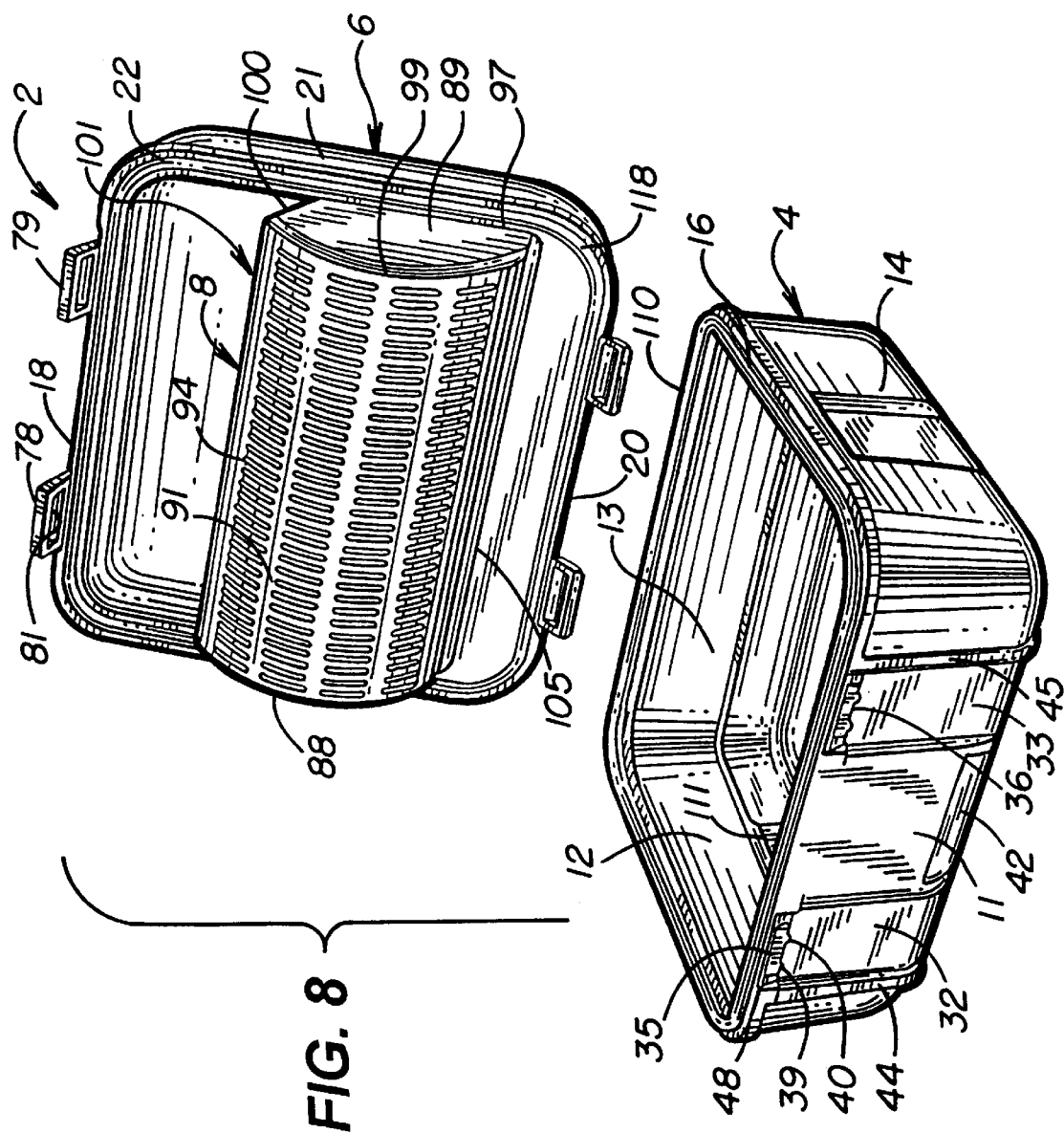
FIG. 8 is a partially exploded view of the litter box assembly of FIG. 1.

With initial reference to FIGS. 1 and 8 the pet litter box assembly of the invention is generally indicated at 2. Pet litter box assembly 2 mainly comprises a base 4, a cover 6 and a waste collecting member 8 (see particularly FIG. 8). In general, base 4 includes a bottom wall 10 from which extend first, second, third and fourth upstanding lower side walls 11–14. Lower side walls 11–14 terminate, at a location remote from bottom wall 10, in an annular ledge portion 16. Cover 6 generally includes a top wall 17 from which extend first, second, third and fourth upper side walls 18–21, all of which lead to a rim portion 22.

Figure 7:
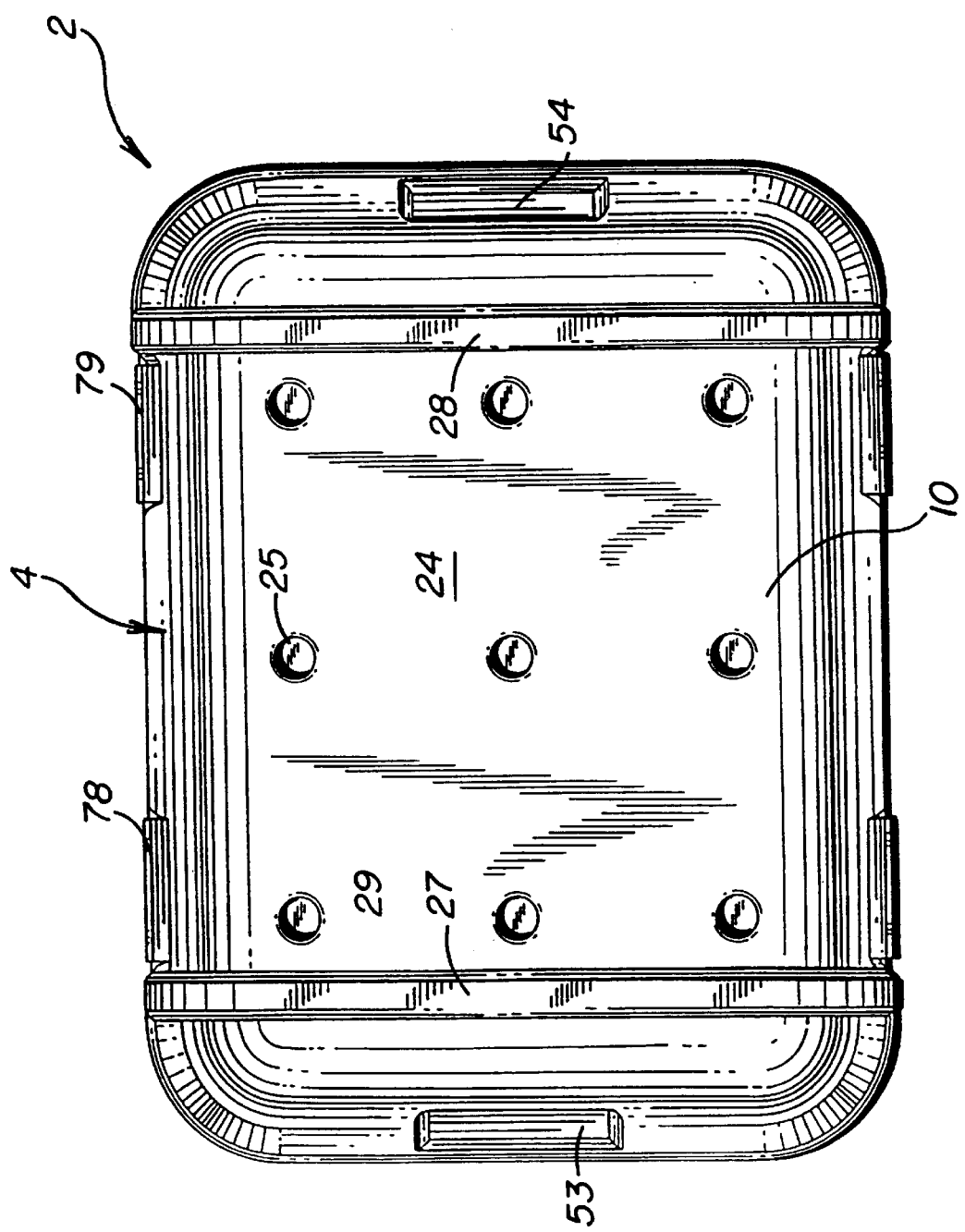
FIG. 7 is a bottom plan view of the litter box assembly of FIG. 1.

A detailed description of the preferred structure of base 4, cover 6 and waste collecting member 8 of pet litter box assembly 2 will now be provided with reference to FIGS. 1–8. First, as best shown in FIG. 7, base 4 has a lower external surface 24 provided with a plurality of spaced, circular-shaped indentations 25 which are, in part, formed due to the preferential method of manufacturing base 4, but which beneficially add structural rigidity to bottom wall 10. Also shown in this figure is a pair of spaced, elongate support strips 27 and 28 projecting from lower external surface 24. Strips 27 and 28 are used to support base 4 on a ground surface during use with external surface 24 being spaced from the ground surface. In order to minimize undesirable shifting of base 4, strips 27 and 28 preferably include a roughened surface as indicated at 29. Support strips 27 and 28, in conjunction with support strips 44, 45, 65 and 66, discussed below, also provide the rotational surface for the litter box assembly.

Figure 3:
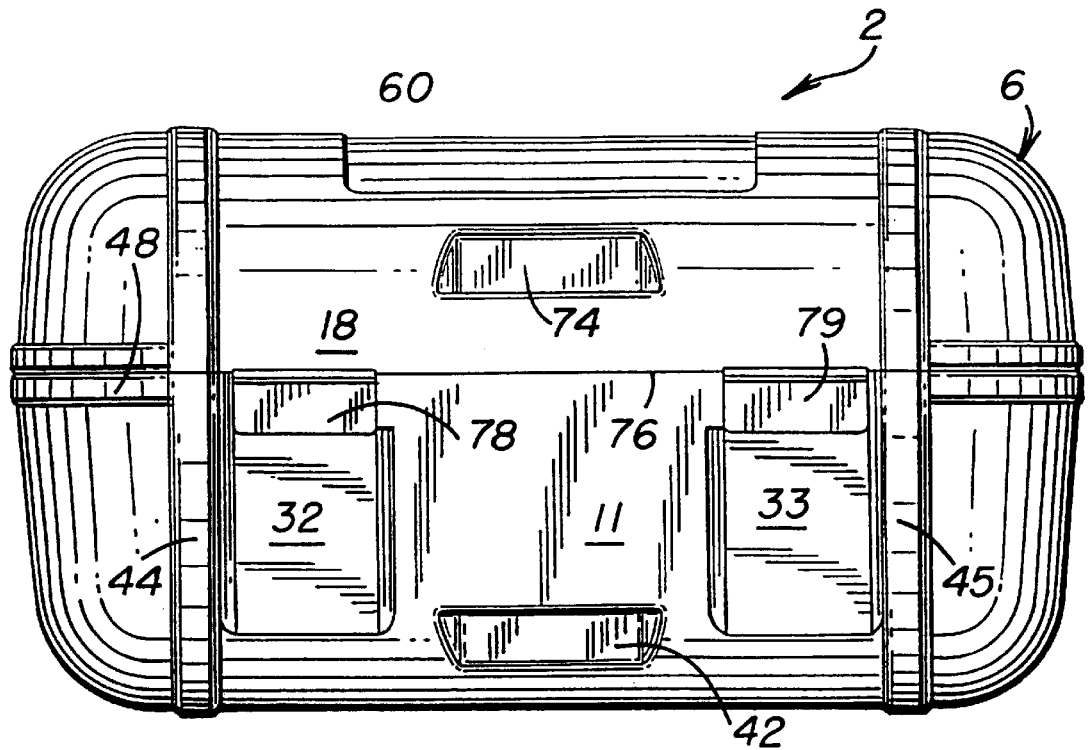
FIG. 3 is a elevational front view of the litter box assembly of FIG. 1.
Figure 4:
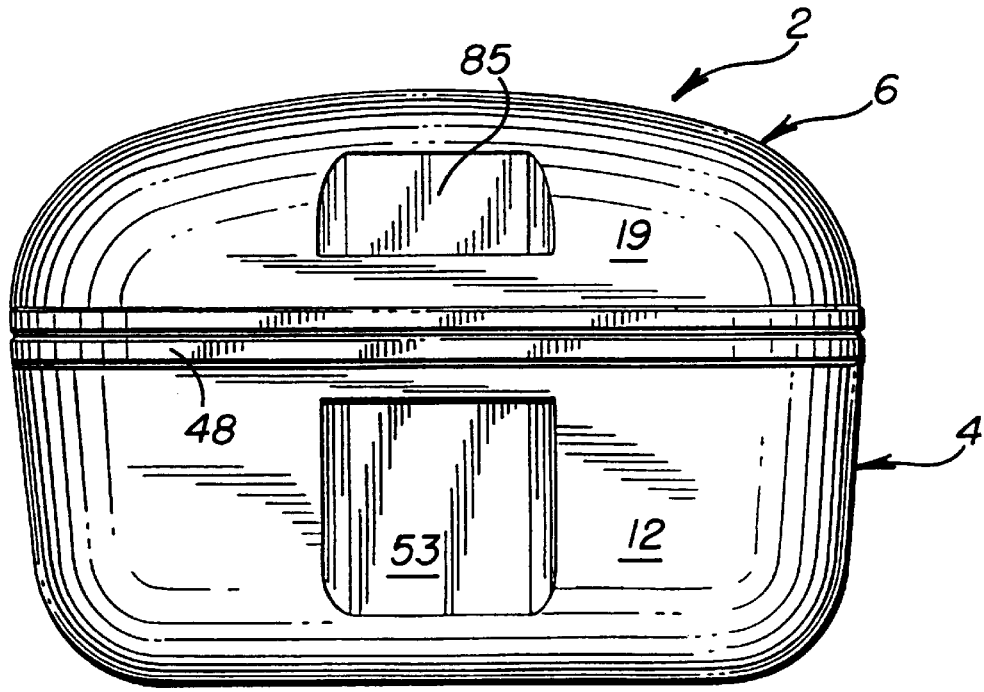
FIG. 4 is a right side view of the litter box assembly of FIG. 1.
Figure 5:
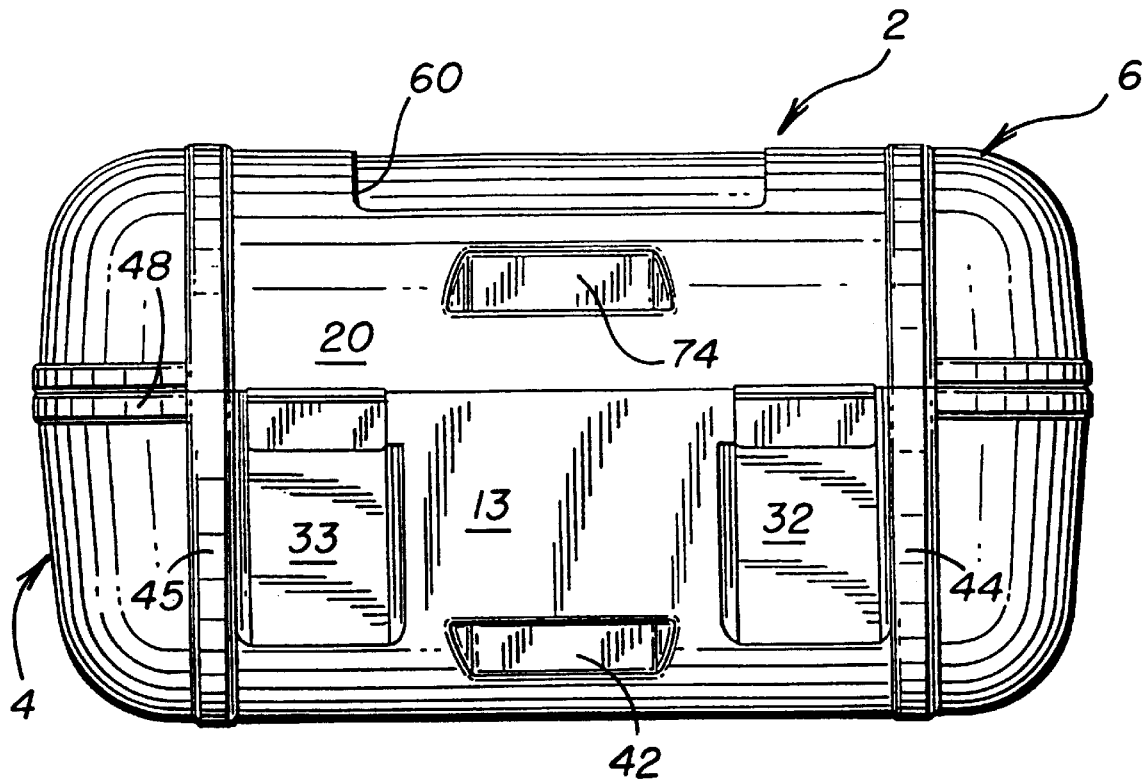
FIG. 5 is a rear side view of the litter box assembly of FIG. 1.
Figure 6:
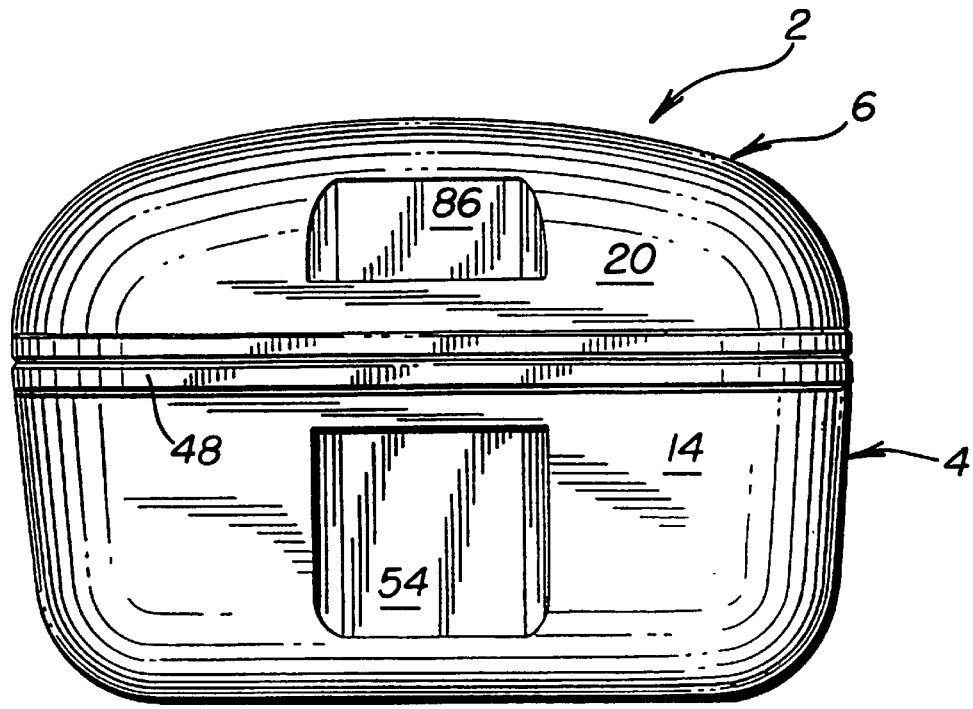
FIG. 6 is a left side view of the litter box assembly of FIG. 1.

As shown in FIGS. 1, 3 and 8, first or front side wall 11 of base 4 is provided with a pair of spaced grooved portions 32 and 33 which define latching lips 35 and 36. Each latching lip 35, 36 is formed with spaced depending flanges 39 and 40, the particular purpose of which will be more fully discussed below. First side wall 11 is also formed with a lower recessed area 42 which functions as a grasping area for base 4 during rotation. In addition, first side wall 11 is provided with support strip extensions 44 and 45 and a raised, lower strip 48. The third or rear side wall 13 of base 4, as clearly shown in FIG. 5, is constructed substantially identical to first side wall 11 (mirror image) and therefore this structure will not be reiterated here but rather like reference numerals have been used to refer to corresponding structure to that described above.

In a similar fashion, second and fourth side walls 12 and 14 are also similarly constructed as clearly evident from viewing FIGS. 1, 4, 6 and 8. Each of second and fourth side walls 12 and 14 are formed with a side handle defining recessed area 53 and 54 respectively. In addition, the upper edges of second and fourth side walls 12 and 14 include a continuing portion of raised lower strip 48.

Figure 2:
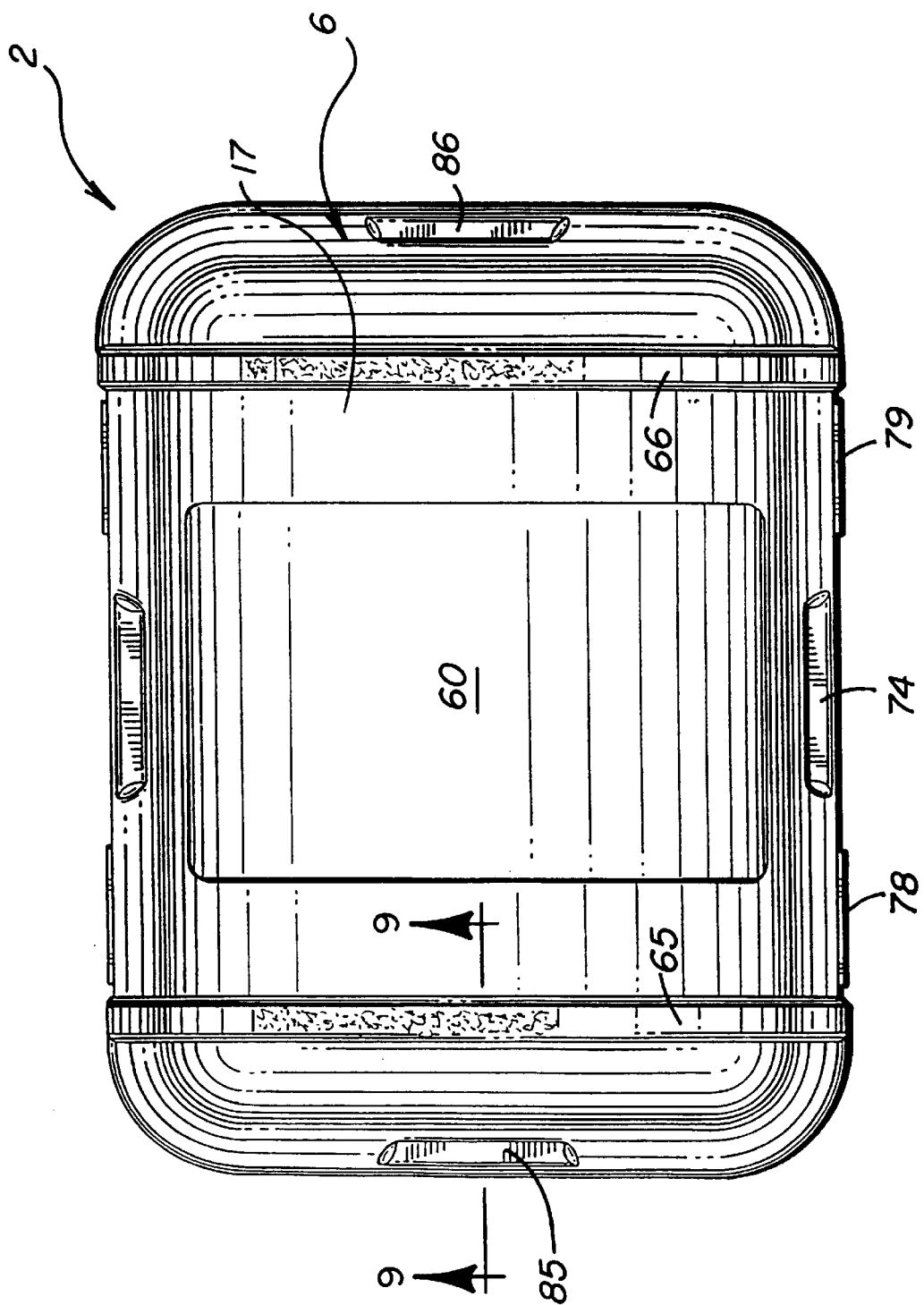
FIG. 2 is a top plan view of the litter box assembly of FIG. 1.

FIGS. 1 and 2 illustrate the top of cover 6 which is provided with a central area 60 which is preferably recessed to provide for an adequate labeling area upon an upper exterior surface (not separately labeled) of cover 6. Cover 6 is also provided with upper support strips 65 and 66 which are aligned with support strips 27 and 28, and support strip extensions 44 and 45 on base 4 to provide the rotational surfaces for the litter box assembly as discussed in detail below. In a manner similar to support strips 27 and 28, upper support strips 65 and 66 are preferably provided with a roughened surface 68 along at least a substantial portion thereof as clearly illustrated in these figures.

The front of cover 6, i.e. first upper side wall 18, is formed with an upper handle defining recessed area 74 and also has depending, from a front edge 76, a pair of latch members 78, 79. As shown in FIG. 8, each latch member 78, 79 includes a frontal lip portion 81 which is adapted to engage a respective latching lip 35, 36 on base 4 to secure cover 6 upon base 4 as will be more filly described below. Third upper side wall 20, as best shown in FIG. 5, is constructed substantially identical to first upper side wall 18 and therefore need not be described here. Likewise, second and fourth upper side walls 19 and 21 are similarly constructed as shown in each of FIGS. 1, 4 and 6 and each is formed with a central indented region 85, 86, respectively. Each indented region 85, 86 can be used in combination with a respective side handle defining recessed area 53, 54 in base 4 to provide handle means for readily grasping pet litter box assembly 2 when cover 6 is attached to base 4 in the manner which will be detailed below.

As shown in FIG. 8, waste collecting member 8 is defined by a pair of spaced, lateral sides 88 and 89 which are interconnected by a body portion 91. Body portion 91 is formed with a plurality of spaced filtering orifices 94 that take the form of slots. Each lateral side 88, 89 has a generally straight edge section 97, an arcuate edge section 99, a frontal edge section 100 and a back edge section 105. Back edge section 105 abuts the inner surface of cover 6. Frontal edge section 100 defines an opening 101 between waste collecting member 8 and the inner surface of cover 6. In the preferred embodiment, waste collecting member 8 is removably attached within cover 6 as described further hereinafter. At this point, however, it should be noted that, although waste collecting member 8 preferably has an arcuate body portion 91, various other shapes could be used as well. For example, body portion 91 could be generally V-shaped or box-shaped in cross-section while still performing the desired filtering function outlined further below.

Figure 9:
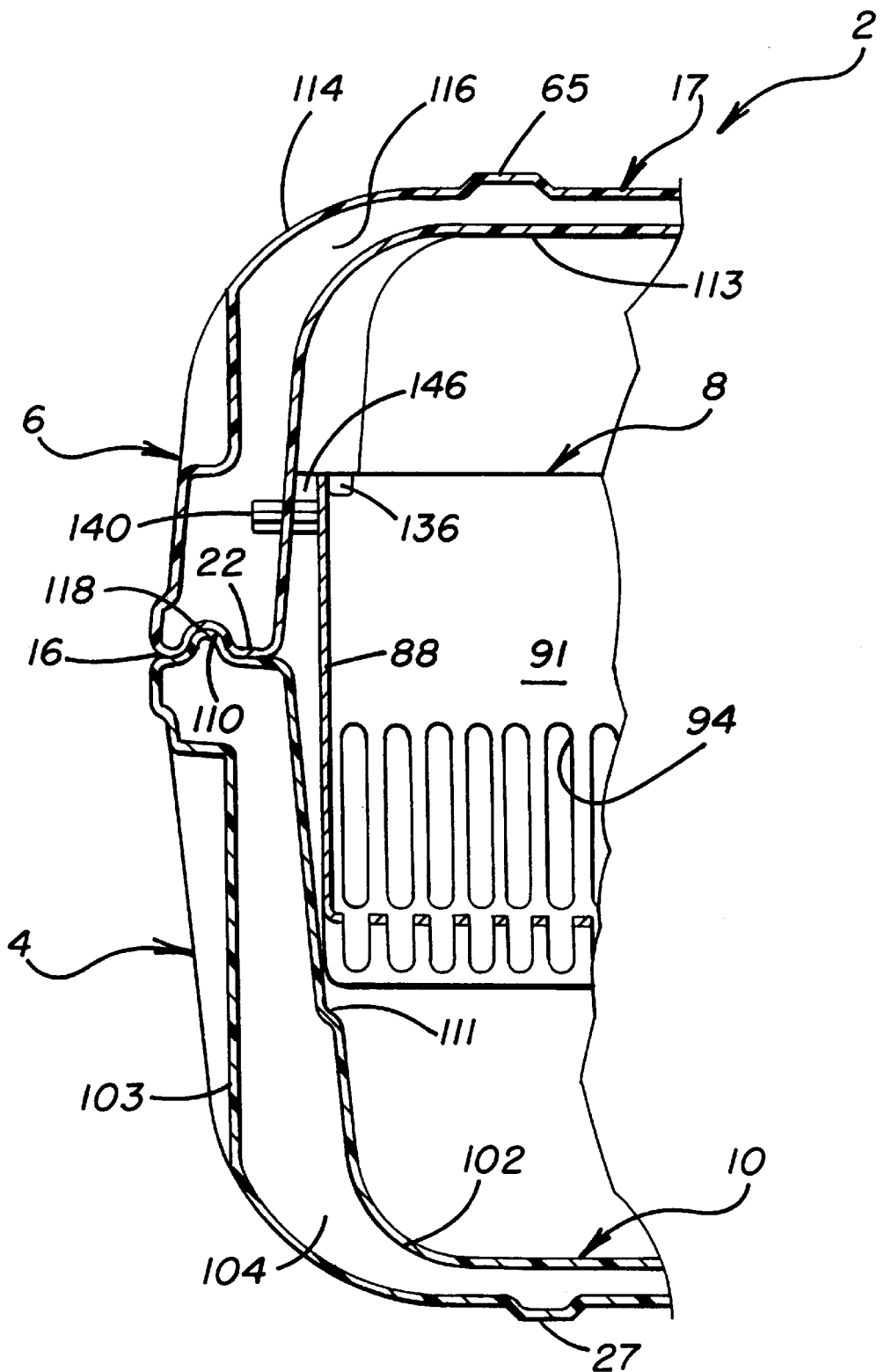
FIG. 9 is a cross-sectional view generally taken along line 9—9 in FIG. 2.

With reference to FIGS. 8 and 9, bottom wall 10 and first, second, third and fourth lower side walls 11–14 of base 4 are actually formed of an inner wall portion 102 and an outer wall portion 103 which are spaced by a void area 104. Inner wall portion 102 and outer wall portion 103 are interconnected, at a position spaced from bottom wall 10 at annular ledge portion 16. Therefore, bottom wall 10 and lower side walls 11–14 are integrally formed, preferably through a plastic molding process such as extrusion blow molding. In addition, annular ledge portion 16 is preferably formed with an annular ridge 110, the purpose of which will be detailed below. At this point, it should also be mentioned that base 4 is provided with an internal fill indicator 111 which is actually constituted by an inwardly directed portion of inner wall portion 102 as clearly shown in FIG. 9. Also, inner wall portion 102 of base 4 preferably slopes generally inwardly from annular ledge portion 16 towards bottom wall 10 in order to aid in containing pet litter in the lower portion of base 4.

Figure 10:
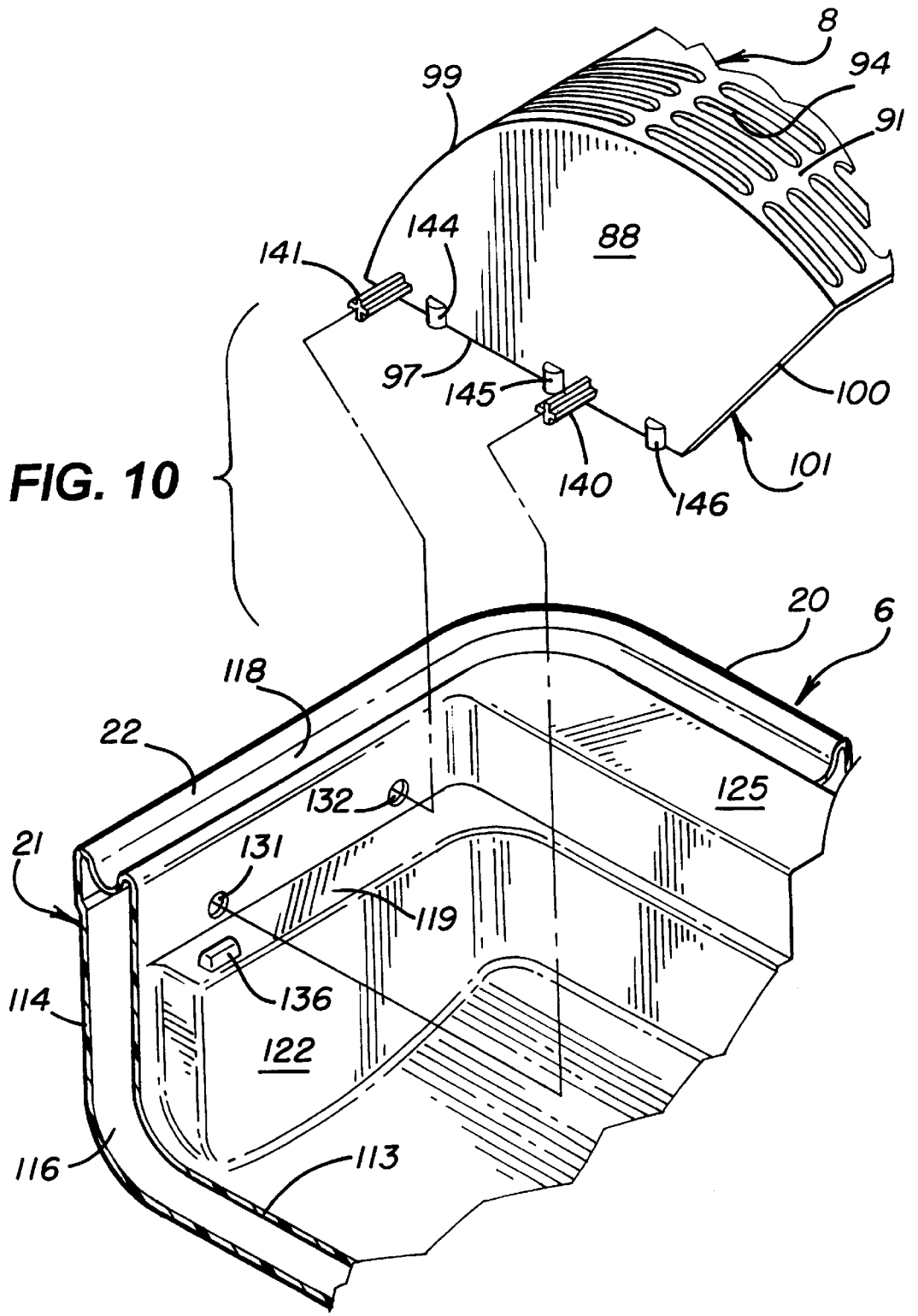
FIG. 10 is an exploded view of a portion of the litter box assembly of the invention.

In a similar fashion, cover 6 is actually formed by an inner wall portion 113 and an outer wall portion 114 spaced by a void area 116. Inner and outer wall portions 113 and 114 are interconnected at a position spaced from top wall 17 by rim portion 22 which is preferably formed with an annular recess 118. Cover 6 is also preferably formed with an internal plateau section 119 (see FIG. 10) that is defined by an inwardly projecting section 122 of inner wall portion 113. In addition, at third upper side wall 20, rim portion 22 of cover 6 is preferably formed with a widened portion 125. Each inner wall portion 113 of second and fourth upper side walls 19 and 21 are formed with a pair of apertures 131 and 132 which are located closer to third upper side wall 20 than first or front upper side wall 18. In addition, plateau portion 119 is provided with a retainer member 136 at a positioned spaced from inner wall portion 113 at each of second and fourth upper side walls 19 and 21.

As also illustrated in these figures with reference to lateral side 88 of waste collecting member 8, a pair of locating pins 140 and 141 project from lateral side 88 at spaced locations adjacent lower edge 97. Also adjacent lower edge 97 is preferably provided various spacers 144–146. Although not shown, lateral side 89 of waste collecting member 8 has corresponding structure. With this arrangement, waste collecting member 8 can be readily attached to and removed from cover 6 by merely positioning locating pins 140 and 141 in apertures 131 and 132 respectively. Spacers 144–146 maintain each lateral side 88 and 89 spaced from a respective inner wall portion 113 while each lateral side 88, 89 is positioned between the inner wall portion 113 and a respective retainer member 136. In the preferred embodiment, waste collecting member 8 is injection molded flexible plastic and lateral sides 88 and 89 can be readily deflected to permit waste collecting member 8 to be easily mounted within and removed from cover 6.

With this construction of pet litter box assembly 2, base 4 can be used by itself as a litter box by simply filling it with litter up to fill indicator 111. When waste and used litter deposited in base 4 needs to be separated from non-used litter, cover 6 can be seated upon base 4 with ridge 110 extending into recess 118. Since base 4 and cover 6 have double-wall constructions, ledge portion 16 and rim portion 22 provide an ample seating area between base 4 and cover 6. When cover 6 is seated on base 4, waste collecting member 8 extends downward from the cover, beyond the plane in which the cover is seated on the base. This minimizes the height of the entire assembly. The frontal lip 81 of latching members 78 and 79 provided on both the first and third upper side walls 18 and 20 of cover 6 can then be manually engaged with depending flanges 39 and 40 of latching lips 35 and 36 to secure cover 6 upon base 4. Thereafter, pet litter box assembly 2 can be lifted and rotated along support strips 27, 28; 44, 45; and 65, 66; to cause the contents of base 4 to flow into waste collecting member 8 through opening 101 defined by frontal edge section 100 prior to again supporting pet litter box assembly 2 upon support strips 27 and 28. Filtering orifices 94 are sized to permit non-used litter to pass therethrough and back into base 4 for future use. However, waste and used litter deposited in base 4 will be maintained within waste collecting member 8. Thereafter, latch members 78 and 79 can be disengaged from latching lips 35 and 36 to separate cover 6 from base 4 and then the material retained in waste collecting member 8 can be disposed of.

From the above, it should be readily apparent that pet litter box assembly 2 provides an efficient pet litter cleaning system. In addition, due to the double wall construction of base 4 and cover 6, the actual thicknesses of inner and outer wall portions 102, 103, 113 and 114 can be reduced as compared to a single wall arrangement while still maintaining or increasing structural integrity and providing an adequate sealing surface area between base 4 and cover 6. Furthermore, since waste collecting member 8 can be readily detached from cover 6, waste collecting member 8 can be easily removed for thorough cleaning which is considered particularly advantageous.

Although described with respect to a preferred embodiment of the invention, it should be readily understood that various changes and/or modifications may be made without department from the spirit of the invention. For instance, although, in the preferred embodiment, annular ledge portion 16 is provided with ridge 110 and rim portion 122 is provided with recess 118, this arrangement could be readily reversed. In addition, although cover 6 has been described as having particular latch members 78 and 79 at both the front and rear sides thereof as fastening means, various other types of fastening means could equally be utilized. Furthermore, it should also be readily apparent to one of ordinary skill in the art that there exists various alternate ways in which waste collecting member 8 could be attached to cover 6 while still performing the filtering function described above. Therefore, the particular mounting arrangement described with reference to the preferred embodiment above should not be considered a limiting feature of the invention. In general, the invention is only intended to be limited by the scope of the following claims.

We claim:

1. A pet litter box assembly comprising:

a base having a bottom wall from which extend first, second, third and fourth upstanding lower side walls, each of said lower side walls including inner and outer wall portions spaced by a void area, the inner and outer wall portions of each of said lower side walls being interconnected by a ledge portion;

a cover including a top wall from which extend first, second, third and fourth upstanding upper side walls, each of said upper side walls including inner and outer wall portions spaced by a void area, the inner and outer wall portions of each of said upper side walls being interconnected by a rim portion, said cover being adapted to be positioned upon said base with said rim portion being seated upon said ledge portion; and a waste collecting member including first and second lateral sides and a body portion extending between said lateral sides, said body portion including a plurality of filtering orifices arranged at spaced locations between said lateral sides, said waste collecting member being adapted to be mounted within said cover with said first and second lateral sides being positioned adjacent the inner wall portions of said second and fourth upper side walls and said body portion extending from adjacent the inner wall portion of said third upper side wall towards, but being spaced from, said first upper side wall such that, when waste and used litter deposited in the base needs to be separated from non-used litter placed in the base, said cover can be seated upon said base and the pet litter box assembly can be rotated to cause the waste and used litter to be collected in the waste collecting member for disposal while the non-used litter passes through said filtering orifices and back into said base for future use.

2. The pet litter box assembly according to claim 1, further comprising a ridge formed in one of said ledge portion and a recess formed in at least one of said rim portion, said ridge being adapted to be received within said recess when said cover is seated upon said base.

3. The pet litter box assembly according to claim 2, wherein each of said ridge and said recess extends substantially entirely about a respective one of said ledge and rim portions.

4. The pet litter box assembly according to claim 3, wherein said ridge is formed in the ledge portion of said base and said recess is formed in the rim portion of said cover.

5. The pet litter box assembly according to claim 1, further comprising means for removably attaching said waste collecting member to said cover.

6. The pet litter box assembly according to claim 5, wherein said attaching means includes a plurality of locating pins carried by one of the lateral sides of said waste collecting member and the inner wall portion of said cover and a plurality of apertures formed in the other of the lateral sides of said waste collecting member and the inner wall portion of said cover, each of said locating pins being adapted to be received within a respective one of said apertures.

7. The pet litter box assembly according to claim 6, wherein said cover is formed with at least one internal plateau upon which the lateral sides of said waste collecting member rest, said at least one internal plateau being provided with at least one upstanding retainer member which is spaced from the inner wall portion of said cover.

8. The pet litter box assembly according to claim 6, further comprising a plurality of spacer members arranged between the lateral sides of said waste collecting member and the inner wall portion of said cover.

9. The pet litter box assembly according to claim 1, further comprising fastening means for securing said cover upon said base.

10. The pet litter box assembly according to claim 1, wherein the bottom wall of the base is provided with at least two elongate support members projecting below a lower surface of said bottom wall upon which said base is adapted to rest, said elongate support members having a roughened outer surface.

11. A pet litter box assembly comprising:
a base having a bottom wall from which extend first, second, third and fourth upstanding lower side walls,
a cover including a top wall from which extends first, second, third and fourth upstanding upper side walls, said cover being adapted to be seated upon said base with each of said lower side walls being aligned with a respective one of said upper side walls;
a waste collecting member including first and second lateral sides and a body portion extending between said lateral sides, said body portion including a plurality of filtering orifices arranged at spaced locations between said lateral sides;
means for removably mounting said waste collecting member within said cover with said first and second lateral sides being respectively positioned adjacent said second and fourth upper side walls and said body portion extending from adjacent said third upper side wall towards, but being spaced from, said first upper side wall such that, when waste and used litter deposited in the base needs to be separated from non-used litter placed in the base, said cover can be seated upon said base and the pet litter box assembly can be rotated to cause the waste and used litter to be collected in the waste collecting member for disposal while the non-used litter passes through said filtering orifices and back into said base for future use; and
where the bottom wall and said first and third walls of said base is provided with at least two elongate support members projecting below a lower surface of said base upon which said container is adapted to rest, and extending upon said surface of said first and third walls of said base, said elongate support members having a roughened outer surface.

12. The pet litter box assembly according to claim 11, wherein said mounting means includes a plurality of locating pins carried by one of the lateral sides of said waste collecting member and said cover and a plurality of apertures formed in the other of the lateral sides of said waste collecting member and said cover, each of said locating pins being adapted to be received within a respective one of said apertures.

13. The pet litter box assembly according to claim 12, wherein said lower side walls are defined by inner and outer wall portions which are spaced by a void area and interconnected by a ledge portion, and said upper side walls are defined by inner and outer wall portions which are spaced by a void area and interconnected by a rim portion, said apertures extending through only the inner wall portions of said cover.

14. The pet litter box assembly according to claim 13, wherein said cover is formed with at least one internal plateau upon which the lateral sides of said waste collecting member rest, said at least one internal plateau being provided with at least one upstanding retainer member which is spaced from a respective said inner wall portion of said cover.

15. The pet litter box assembly according to claim 14, further comprising a plurality of spacer members arranged between the lateral sides of said waste collecting member and the inner wall portion of said cover.

16. The pet litter box assembly according to claim 13, further comprising a ridge formed in one of said ledge portion and said rim portion and a recess formed in the other of said ledge portion and said rim portion, said ridge being adapted to be received within said recess when said cover is seated upon said base.

17. The pet litter box assembly according to claim 11, wherein said lower side walls are defined by inner and outer wall portions which are spaced by avoid area and interconnected by a ledge portion, and said upper side walls are defined by inner and outer wall portions which are spaced by a void area and interconnected by a rim portion.

18. The pet litter box assembly according to claim 17, further comprising a ridge formed in one of said ledge portion and said rim portion and a recess formed in the other of said ledge portion and said rim portion, said ridge being adapted to be received within said recess when said cover is seated upon said base.

19. The pet litter box assembly according to claim 11, further comprising a plurality of latches for securing said cover upon said base.

20. The pet litter box assembly according to claim 11, wherein the bottom wall of said base is provided with a plurality of spaced indentations to add structural rigidity to the bottom wall .

21. The pet litter box assembly according to claim 17, wherein said base includes an internal fill indicator formed by an inwardly directed portion of said inner wall portion of said lower side walls.

22. The pet litter box assembly according to claim 11, further comprising handle means in said cover and base for readily grasping the litter box assembly when the cover is attached to the base.

23. The pet litter box assembly according to claim 11, wherein said waste collecting means extends below the plane in which the cover is seated upon the base.

24. A pet litter box assembly comprising:
- a base having a bottom wall from which extend first, second, third and fourth upstanding lower side walls, each of said lower side walls including inner and outer wall portions spaced by a void area, the inner and outer wall portions of each of said lower side walls being interconnected by a ledge portion having a ridge formed therein;
- a cover including a top wall from which extend first, second, third and fourth upstanding upper side walls, each of said upper side walls including inner and outer wall portions spaced by a void area, the inner and outer wall portions of each of said upper side walls being interconnected by a rim portion having a recess formed therein, said cover being adapted to be positioned upon said base with said rim portion being seated upon said ledge portion;
- a removable waste collecting member including first and second lateral sides and a body portion extending between said lateral sides, said body portion including a plurality of filtering orifices arranged at spaced locations between said lateral sides, said waste collecting member being adapted to be mounted within said cover with said first and second lateral sides being positioned adjacent the inner wall portions of said second and fourth upper side walls and said body portion extending from adjacent the inner wall portion of said third upper side wall towards, but being spaced from, said first upper side wall such that, when waste and used litter deposited in the base needs to be separated from non-used litter placed in the base, said cover can be seated upon said base and the pet litter box assembly can be rotated to cause the waste and used litter to be collected in the waste collecting member for disposal while the non-used litter passes through said filtering orifices and back into said base for future use; and
- means for removably attaching said waste collecting member to said cover including a plurality of locating pins carried by one of the lateral sides of said waste collecting member and the inner wall portion of said cover and a plurality of apertures formed in the other of the lateral sides of said waste collecting member and the inner wall portion of said cover, each of said locating pins being adapted to be received within a respective one of said apertures.

* * * * *